March 21, 1939.  F. L. CURTISS  2,151,014
SAFETY DEVICE FOR VEHICLES
Filed April 4, 1938　　2 Sheets-Sheet 1
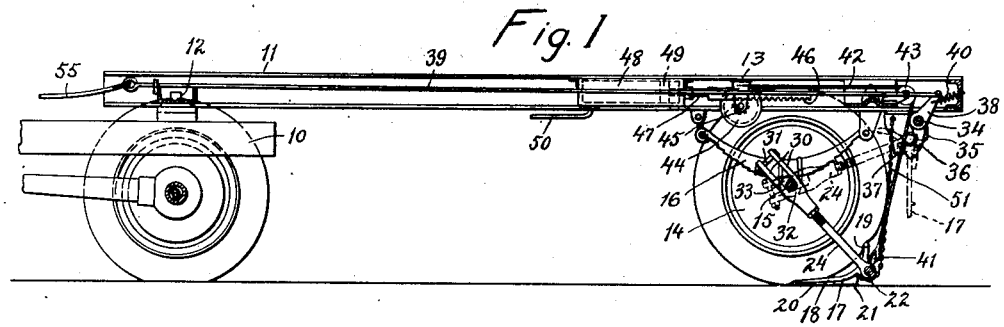
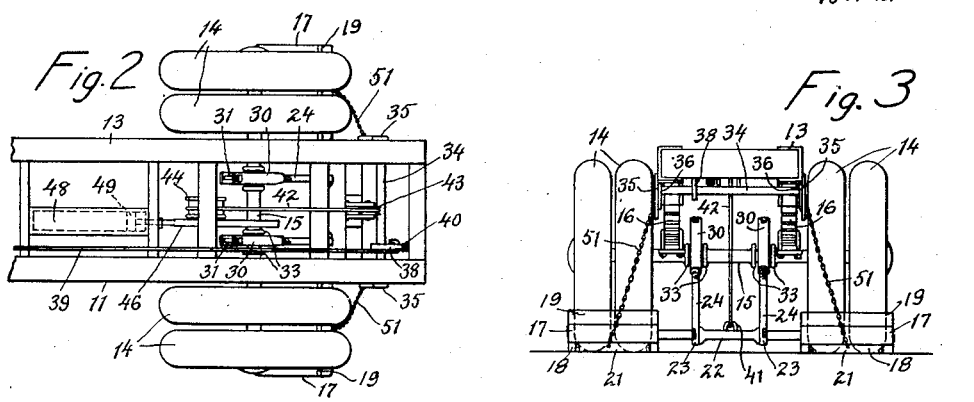
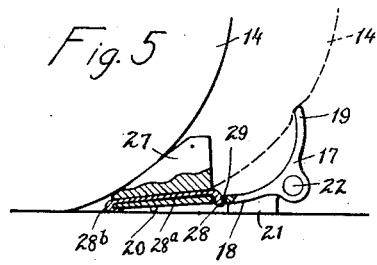 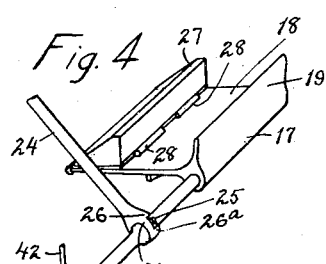
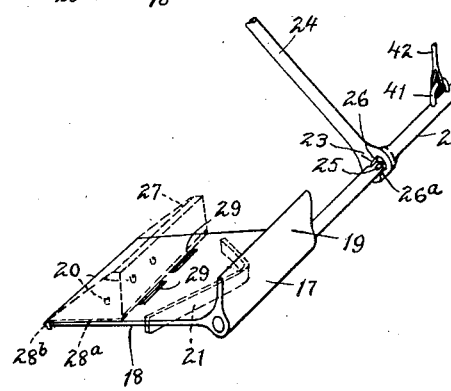
Inventor,
Frank L. Curtiss
By N. S. Amstutz
Attorney March 21, 1939.  F. L. CURTISS  2,151,014
SAFETY DEVICE FOR VEHICLES
Filed April 4, 1938  2 Sheets-Sheet 2
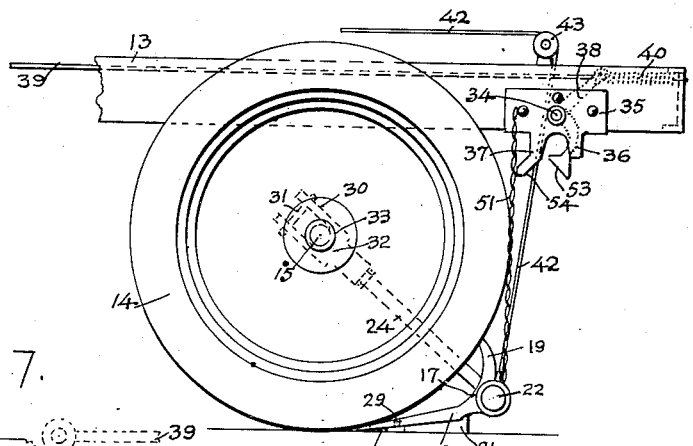
Fig. 6.
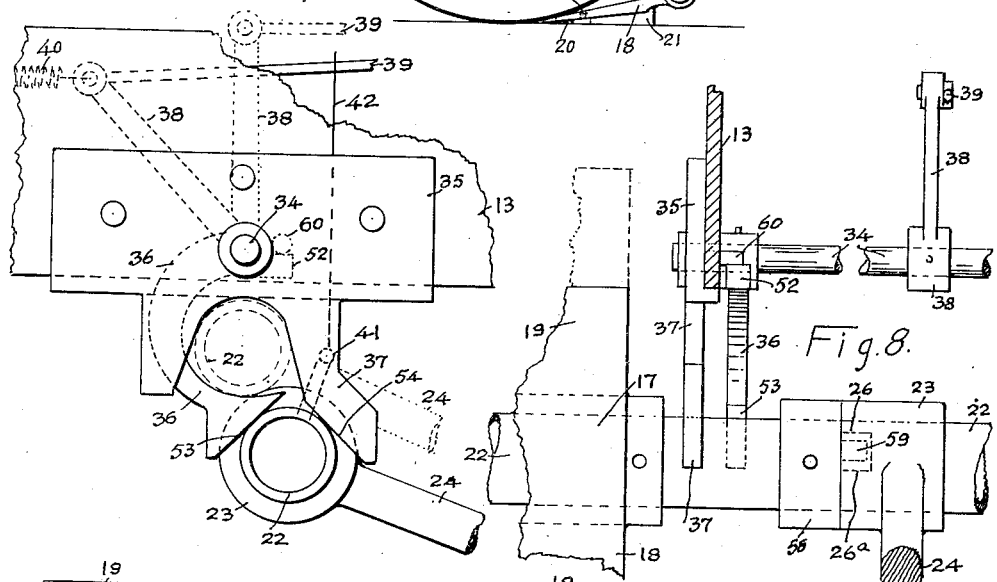
Fig. 7.
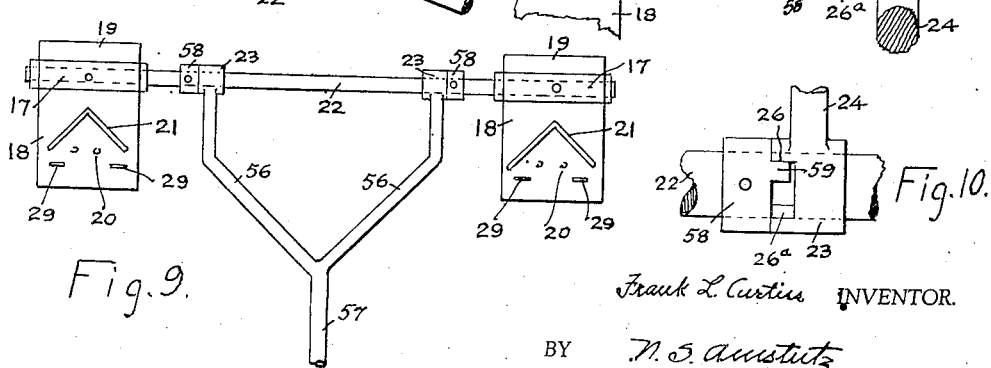
Fig. 8.
Fig. 9.
Fig. 10.
Frank L. Curtiss INVENTOR.
BY N. S. Amstutz
ATTORNEY.

Patented Mar. 21, 1939

2,151,014

UNITED STATES PATENT OFFICE 2,151,014

SAFETY DEVICE FOR VEHICLES

Frank L. Curtiss, Lodi, Ohio

Application April 4, 1938, Serial No. 199,872

4 Claims. (Cl. 188—4)

My invention relates to improvements in safety device for vehicles and it more especially includes the features pointed out in the annexed claims.

The purpose of my invention is to provide easily applied safe guards against trailers, trucks etc., etc., from backing down hill in case a stop is made necessary; that also provides an easy removal of the safe guard when the vehicle is again starting; that in addition makes provision for the negotiating of a hill in icy weather by alternately zigzagging from side to side of the roadway.

With these and other ends in view I illustrate in the accompanying drawings such instances of adaptation as will disclose the broad features of the invention without limiting myself to the specific details shown thereon and described herein.

Fig. 1 is a longitudinal sectional view showing the application of the safe guard to the rear of a wheel.

Fig. 2 is a top plan view of the rear portion of Fig. 1.

Fig. 3 is a rear elevation of Fig. 1.

Fig. 4 is a partial perspective showing the safe guard detached from the vehicle chassis.

Fig. 5 is an enlarged detail side elevation of a safety shoe and an auxiliary chock block and in dotted lines the relation of the shoe to the wheel without the use of the block.

Fig. 6, Sheet 2, is an enlarged modification of the rear end of Fig. 1.

Fig. 7 is an enlarged side elevation of one of the automatic catches shown in Fig. 6.

Fig. 8 is an elevation of Fig. 7 looking rearward.

Fig. 9 is a modified form of radial connection to the axle.

Fig. 10 is an elevation of a modified connection from a radial arm to the cross member on which the shoes are supported.

In using my invention I may employ whatever alternatives or equivalents of structure that the exigencies of varying conditions may demand without departing from the broad spirit of the invention.

Any form of motor tractor 10 may be connected to the forward end 11, by means of a pin 12 to a trailer or other frame 13.

The frame or chassis 13 is supplied with the conventional rubber tired wheels 14, which in the case of a trailer are attached rigidly to a cross axle 15. The chassis 13 may be supported on the axle by springs 16.

The safety feature of my invention resides in the use of a pair of shoes 17. These are formed with a relatively flat portion 18 and a curved upstanding portion 19 that will abut the tire. On the underside of the plate portion 18 several anti-slipping calks 20 may be formed. Provision is also made to guard against further slipping by forming angular projections 21 on the under side of the plates.

The length of the relatively flat portion 18 of the shoes 17 may be such that the front edge of the plates would extend forward of the center of the wheels so that each wheel will rest on its corresponding plate regardless of the use of the chock blocks 27 thus entirely freeing the wheel from the ground.

The shoes 17 have an enlargement in which the cross rod 22 is secured. This rod is held in adjustable relation to the axle 15 by enlarged portions 23 of the radial arms 24 which engage the axle. Pins 25 are a part of the rod 22. They coact with notch formed in the enlargement 23. This notch has a front edge stop shoulder 26 and a rear edge shoulder 26ª. The pin and cooperating shoulders 26 and 26ª serve to direct the front end of the shoes 17 forward toward the underside of the wheel 14 as the shoes are lowered instead of simply having the shoes move downward with the flat portions 18 standing vertical as the pavement is approached.

To make provision for the movement of a vehicle up a hill on an icy pavement I may use the extra chock blocks 27. These are supplied with rearwardly positioned hooks 28 that form a part of the bottom plate 28ª. This plate at its front end has an abutting flange 28ᵇ which engages the front end of the flat portion 18 of the shoes 17. The hooks 28 serve to hold the chock blocks 27 in place by entering the slots 29.

The radial arms 24 are forked at 30 to pass over the axle 15. A stop pin 31 joins the ends of the fork. The slot of the fork ends at 32. Enlargements 33 on the axle, or their equivalents serve to hold the radial arms 24 from moving endwise on the axle.

There is a transverse rock shaft 34. It has a bearing in two plates 35 that are secured to the chassis 13. This shaft has depending hooks 36, one at each end. The plates 35 have downward projections 37 which cooperate with the hooks 36 in positioning the supporting bar 22 in its raised position. The rock shaft 34 is actuated by a rock arm 38 that is secured to the shaft. A link 39 may lead from this arm to any desired position, forward, adjacent the driver's seat. A spring 40 acts against the link 39 and serves to hold the hooks 36 in a closed position.

The shoe supporting bar 22 has a loop 41 at about mid-way of its length to which a cable 42 is attached. This cable passes over a guide sheave 43 and thence to a winding drum 44. The drum on its axis has a pinion 51 which is actuated by a rack 46 that is attached to a piston rod 47. A cylinder 48 contains a piston 49 to which the piston rod 47 is connected. An air pipe 50 leads to a source of supply and to the driver's position. From here the shoes 17 can be raised at will through the piston 49 actuating the rack 46 to rotate the drum 44 so as to wind up the cable and raise the rod 22 to move past and be held by the hooks 36.

To make additional provision against the wheels 14 rolling backward two chains 51 may be used to rest diagonally against the wheels. The bottom end of each chain is fastened to a shoe 17 and the upper end is secured to the chassis 13.

In order to provide a limit to the movement of the hooks 36 they have a projection 52 which engage the stop 60, Fig. 7. These hooks have a beveled or inclined end that cooperates with the inclined face 54 of the projection 37. A cord 55 may form an extension of the link 39.

The pair of radial arms 24, Fig. 4 may be modified, as shown in Fig. 9. In this instance two forked arms 56 which support the bar 22 are joined into one radial arm 57. This arm serves the same purpose as the two arms 24. The pin expedient 25 is modified in Fig. 10 wherein an arm 24 has a notch formed in the enlargement 23. This notch is similar to that shown in Fig. 4; it has shoulders 26 and 26ª however instead of the pins 25. A collar 58 is secured to the bar 22 alongside an enlargement 23. It has a projection 59 that extends into the notch of the enlargement 23.

The incline of the plates 17 cause the wheel to ride up the incline as they settle down onto the pavement. In starting, this incline is of assistance because the first movement of the wheels is to roll forward off from this inclination in contrast to that of the hill on which the vehicle is stopping.

Should it be found desirable and necessary to do zig-zagging or in the vernacular of the highways to resort to "jack-knifing" to move the vehicle at an angle across the road instead of going straight forward up the hill to make it easier to start the load the following procedure may be followed. After the wheel on one side has rolled off from its shoe the auxiliary chock block 27 is placed on the plate 18 on the same side of the vehicle to provide a fulcrum against which the wheel will be held as a pivot around which the vehicle will swing in another direction. This will start the load and the vehicle may proceed up the hill with the plates sliding on the pavement. On reaching the top of the hill the auxiliary blocks are removed for use at another time and the plates are raised to their upper position by the drum 44, operated in any desired manner, electrically, pneumatically or manually.

It is of course understood that if desired I may incorporate automatic means (not shown) for dropping the plates instantly on a rearward movement of the vehicle, only while the chassis is inclined.

There is a close cooperation between the cable 42 and the link 39 with its cord 55 so that on the operation of the link 39 to drop the shoes the air in the cylinder is released at the same time so that the cable 42 is free. In the raising of the plates the air in the cylinder need only be applied during the actual raising of the plates to rotate the winding drum 44. A direct connected motor (not shown) may be connected to the drum or its pinion or otherwise to operate the cable. In any event, as stated above the cable must be free at the same time that the hooks 36 release the shoe supporting rod 22.

What I claim is:

1. In vehicle safety devices, a chassis, wheels beneath the chassis, inclined plates adapted to be placed to the rear of a wheel, a supporting bar for the plates, radial arms connecting the bar to the axle of the wheels for to and fro movement thereon, a rock shaft pivoted in the chassis, beveled hooks secured to the shaft, a cable for raising the bar, a spring for holding the hooks in a closed position, and cooperating means depending from the chassis for guiding the bar into position above the hooks.

2. In safety devices for wheeled vehicles, a chassis, supporting wheels thereunder, a cross bar, a rigidly secured shoe near each end of the bar, means comprising automatic under hooked catches on the chassis for holding the bar for instant release, means for letting the front end of the shoes move forward as the bar approaches the roadway, and means for again raising the bar to its inactive position onto the automatic catch.

3. In safety devices for vehicles, a chassis, supporting wheels thereunder, placeable and removable shoes adapted to engage the roadway at the rear of the wheels, and wheel engaging chains adapted to engage diagonally against the wheels, one end of the chains being secured to the shoes and the other end to the chassis.

4. In safety devices for vehicles, a chassis, wheels beneath the chassis, inclined plates or shoes adapted to be lowered to the rear of the wheels, a supporting bar in common for the plates or shoes, radial means slidably adjacent the wheel axle forming bearings at one end thereof for the bar, means on the chassis for raising the bar into an inactive position, and means on the bar comprising projections and clearance recesses in the bearings permitting the projections to alternately engage the opposite faces of the recesses to permit the bearings to have limited movement on the bar independently of the bar so as to move the front end of the shoes on an arc similar to the curvature of the wheel.

FRANK L. CURTISS.